Figure 1:
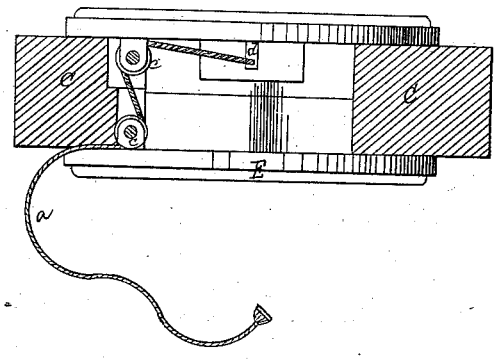
Figure 2:
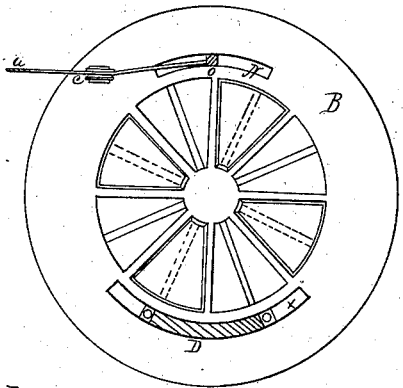
Figure 3:
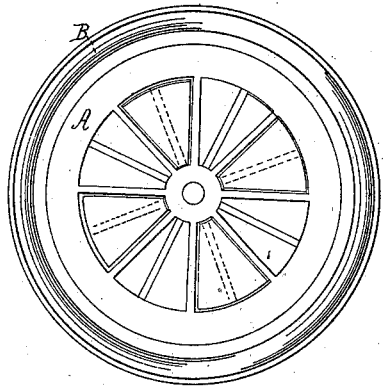

S. W. Williams
House Ventilator

Nº 33,325.   Patented Sep. 17, 1861.

Witnesses:
C. M. Alexander
A. A. Yeatman

Inventor:
S. W. Williams

UNITED STATES PATENT OFFICE.

SAMUEL W. WILLIAMS, OF CENTREVILLE, NEW YORK.

IMPROVEMENT IN VENTILATORS FOR HOUSES.

Specification forming part of Letters Patent No. 33,325, dated September 17, 1861.

*To all whom it may concern:*

Be it known that I, SAMUEL W. WILLIAMS, of Centreville, in the county of Allegany and State of New York, have invented certain new and useful Improvements in Ventilators for Houses; and I do hereby declare that the following is a full, clear, and exact description of the same, reference being had to the accompanying drawings, and to the letters of reference marked thereon.

The nature of my invention consists in constructing and arranging the several parts of this invention in the manner hereinafter set forth.

In the annexed drawings, making a part of this specification, C represents either the wall of the building in which the apparatus is placed or a frame with an annular opening in it which is placed in an opening in the wall.

Upon one side of the wall C is secured a wheel E, with proper openings for receiving and transmitting air. Upon the other side of the wall are secured two wheels or disks A and B. B is the larger and is secured permanently to the wall, while A is movable and is secured to wheel B. These two wheels are provided with openings through which air is admitted, but the alternate openings of each wheel are supplied with glass or translucent panels, if desired, and the two wheels are so fitted together that when A is moved the proper distance the panels in it cover the openings in wheel B, thus cutting off the air and stopping ventilation. Wheel B is provided with two slots $x$ and $z$ upon opposite sides, while the wheel A is provided with a pin $o$ and a weight D, which project through these slots. A cord $a$ is secured to the pin $o$, and passing around the pulleys $c\ c$ hangs down on the inside of the room. By drawing upon the cord $a$ the wheel A is revolved, so that the openings in the two wheels are closed by the corresponding panels of each, but when the cord is loosened the weight B moves the wheel A in an opposite direction, causing free ventilation from the apartment.

When glass is used as panels in the wheels, light will be admitted and the ventilator will serve the double purpose of window and ventilator.

Having thus fully described my invention, what I claim as new, and desire to secure by Letters Patent, is—

The arrangement of the wheels A and B, provided with ventilating-openings and alternate panels of glass, the two being connected and constructed as set forth, so as to be operated by means of a weight and cord, said ventilator being used for the double purpose of giving light and ventilation, as is fully specified.

SAMUEL W. WILLIAMS.

Witnesses:
EDWARD FOX,
E. P. CARTER.